July 30, 1963 R. C. KERCH ET AL 3,099,419

MAGNET WIRE TENSIONING DEVICE

Filed Dec. 19, 1961

INVENTORS.
RONALD C. KERCH
GEORGE D. HILKER
BY
Davis, Hoxie, Faithfull & Hapgood
ATTORNEYS.

United States Patent Office 3,099,419
Patented July 30, 1963

3,099,419
MAGNET WIRE TENSIONING DEVICE
Ronald C. Kerch and George D. Hilker, Fort Wayne, Ind., assignors to Phelps Dodge Copper Products Corporation, New York, N.Y., a corporation of Delaware
Filed Dec. 19, 1961, Ser. No. 160,551
5 Claims. (Cl. 242—147)

This invention relates to devices for applying tension to an insulated electrical conductor.

In the winding of electrical coils, and the like, from an insulated electrical conductor, commonly known as magnet wire, it is desirable to apply a small amount of tension, up to about ten pounds, to the magnet wire as it passes to the winding operation. This tension should be applied fairly uniformly irrespective of whether the machine winding the magnet wire is starting up, stopping or otherwise changing speed. The tension device also should remove any curvature in the wire which may exist in it from previous winding or storage in a coiled position, and should not introduce any curvature in the magnet wire, which can be easily bent, as any bends in the wire may cause tangling and breaking during the winding operation. The tension device should also not damage the insulation coating on the magnet wire.

Prior devices proposed for tensioning wire are deficient in one or more of the foregoing features when used in applying tension to magnet wire. Devices applying tension to the wire by pressing together two metal surfaces are frequently harmful to the insulation coating; other devices produce slack between the tension device and the winding machine when shut down, which can damage the wire when the winding machine is restarted or can produce a winding which is too loose; and other devices cause undue stretching of the magnet wire, which has a low tensile strength, upon initial start-up of the winding machine.

United States Patent No. 2,426,631, issued September 2, 1947, to Mapes, discloses a wire-tensioning device consisting essentially of two fibrous strands interwound to apply a high tension to a wire of high tensile strength. Such a device is not satisfactory for use in applying a low tension in winding magnet wire, as it introduces a curvature in the wire. This bending is undesirable for several reasons: (1) it may cause later tangling or knotting and breaking when the magnet wire is further handled, and (2) the combination of bending and tension may cause cracking of the normally resinous insulation coating.

The device of the present invention satisfies all of the aforementioned requirements for this type of application and has no moving parts and is relatively inexpensive to fabricate.

Figure 1:
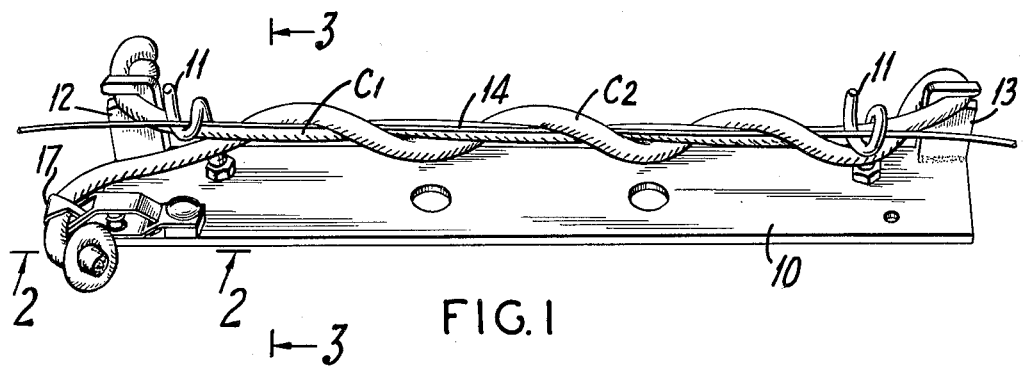
Figure 2:
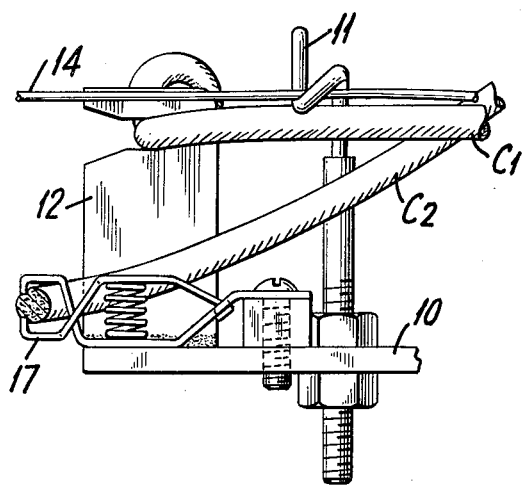
Figure 3:
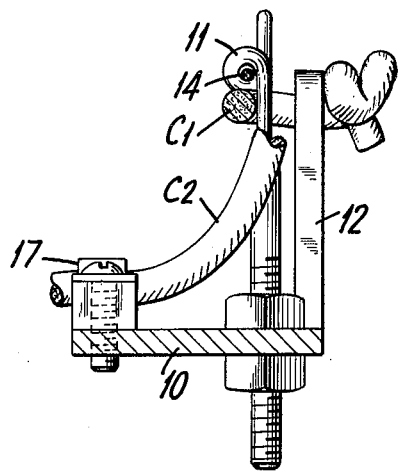

A preferred embodiment of our tensioning device is shown in the accompanying drawings, in which:

FIG. 1 is a perspective view of the device;
FIG. 2 is an enlarged view on line 2—2 in FIG. 1; and
FIG. 3 is a sectional view on line 3—3 in FIG. 1.

Referring to the drawings, the device comprises a frame 10, which is held stationary by mounting on a bracket (not shown) and which preferably carries guide means 11 in the form of "pigtails" for guiding the magnet wire 14 through the device. The frame has cord securing elements 12 and 13, respectively, at opposite ends of the frame.

In order to impart tension or drag on the magnet wire, a cord is held securely at one end by the cord securing element 12 and has a first length C1 extending along and closely adjacent the magnet wire 14 to the other end of the frame where it is held by the other cord securing element 13, which may be identical to the element 12. A second length C2 of the cord is then extended back in the opposite direction and wound around the magnet wire 14 and the adjacent straight length C1 of the cord back toward its beginning. The free end of the wound second length C2 is then secured in a suitable manner, as by a releasable clip 17 secured to frame 10.

The straight length C1 of the cord is preferably taut in order to keep the magnet wire 14 straight. The amount of tension imparted to the wire will depend, of course, upon how tightly the return length C2 of the cord is wound and how many times that length is wound around the wire and the first length C1 of the cord.

The cord means C1—C2 for applying tension to the magnet wire may, within the scope of our invention, consist of two separate cords, each fixed to separate ends of the device, rather than a continuous length of cord, but obviously the use of a single length of cord is more convenient and therefore preferable.

The cord may be fabricated from any fibrous or plastic material, including the customary rope materials; and may be in the form of a single filament length of plastic or plastic coated rope. We prefer to use a cord made of nylon fiber as it is a very suitable material bearing on the magnet wire insulation, is not flammable, and is long-wearing. The precise thickness of the cord is not critical, but the diameter of it should preferably be several times that of the magnet wire in order that the wound cord surface bearing on the wire is fairly well distributed over the length of the magnet wire in the tensioning device.

The cord securing means 12—13 are shown in the form of posts each having a slot for receiving the cord, the end of the first cord length C1 being knotted to hold it in the slot of post 12. The frame 10, cord securing means 12, 13 and 17, and the guide means 11 may be fabricated from metal or a rigid plastic such as nylon. If the guides 11 are metallic, they may be coated with a plastic material, such as nylon, in order to eliminate the possibility of a metal surface bearing upon the magnet wire and damaging its insulation.

Our tensioning device is unique in being capable of applying low tension to magnet wire traveling through it at high speeds without damaging the magnet wire insulation. It does not create slack in the magnet wire when winding is stopped and does not stretch the wire on start of winding. It will remove bends in the wire and will not add curvature to it. Also, it will not pass vibrations in the wire occurring prior to the tensioning device, such as may arise during the winding of a rectangular shaped coil of magnet wire. Further advantages of our device are that it is simply made, simply operated, inexpensive to produce, and has no moving parts so that in normal operation the only part needing replacement from time to time is the cord which applies tension to the passing magnet wire.

While the tensioning device herein described is principally useful in tensioning magnet wire when it is being wound to produce a finshed article, it may also be advantageously used in other instances where it is desirable to apply tension to magnet wire, for example, where magnet wire is being transferred from one reel to another or in other instances where the wire is wound or rewound.

In referring to our device, we have described its operation on a single magnet wire. In similar fashion it may also be used in tensioning more than one wire passing through it, provided the speed of each wire is approximately the same.

We claim:

1. The combination of a longitudinally movable magnet wire to be tensioned, a straight cord length parallel and adjacent to the magnet wire, a second cord length wound around both said straight cord length and said magnet wire to hold the straight cord length in engagement with the wire, and stationary means for securing the respective cord lengths at their ends, whereby said cord lengths are operable to impose a drag on the moving wire while removing bends in the wire.

2. The combination defined in claim 1 wherein said cord lengths are made from a plastic material.

3. The combination defined in claim 1 wherein said cord lengths are made from nylon.

4. The combination defined in claim 1 wherein said securing means include a stationary frame and cord securing elements at opposite end portions of the frame.

5. The combination defined in claim 1 wherein said cord lengths are formed by a single cord, said securing means including a stationary frame and cord securing elements at opposite end portions of the frame, said elements securing the ends of the cord to one end portion of the frame and securing the cord intermediate it ends to the other end portion of frame.

References Cited in the file of this patent

UNITED STATES PATENTS 2,426,631  Mapes _____ Sept. 2, 1947